UNITED STATES PATENT OFFICE.

ALPHONSE EXBRAYAT, OF PARIS, FRANCE.

PROCESS FOR THE MANUFACTURE OF AGGLOMERATES.

1,154,980. Specification of Letters Patent. Patented Sept. 28, 1915.

No Drawing. Application filed June 22, 1914. Serial No. 846,552.

*To all whom it may concern:*

Be it known that I, ALPHONSE EXBRAYAT, of 16 Rue Trétaigne, Paris, Republic of France, have invented a Process for the Manufacture of Agglomerates, of which the following is a full, clear, and exact description.

The present invention has for its object a process for the manufacture of agglomerates or blocks of anthracite, coke, lignite, coal, charcoal, ores and so forth which produce no smell or smoke and which resist moisture.

In order to agglomerate coal dust, pitch is generally utilized, but it presents the defect of liberating a thick and dirty smoke.

In order to avoid this smoke, the expedient has been adopted of distilling the mixture of pitch and coal in a closed vessel in order to eliminate the carbureted hydrogen but this method presents the inconvenience of being costly and of furnishing a product presenting the appearance of coke, and of which the calorific value is considerably less than that of the coal and pitch from which it was produced.

It has also been proposed to replace the pitch by feculent compounds such as dextrin, starch, flour and so forth or by the residual products of paper mills and sugar factories, but these methods are costly and the binders of this class are soluble in water, and the agglomerates are attackable by moisture.

The process forming the object of the present invention overcomes the defects enumerated above.

This method is broadly characterized by the employment as agglomerant of an insoluble soap which oxidizes and hardens in the atmosphere; it is obtained from marine plants or other vegetables containing fucine or gelose and cellulose, which plants are treated with hot water or steam and mixed with soda or caustic lime or with hydraulic lime.

Preferably an appropriate quantity of flour is added to the marine plants. A small quantity of a resinous product may also be added to the mixture to insure the preservation of the agglomerate and an oxidizing agent may also be added to consume the smoke arising from the resinous product or from the coal.

The agglomerant is preferably obtained in employing marine plants such as varecs or fucus (which are varieties of kelp) owing to the large quantity of gelose that they contain. These plants are torn into fragments and reduced to powder by means of apparatus employed in shredding or pulverizing vegetables and they are then treated with hot water or steam in suitable proportions. Sodium hydroxid is added to these marine plants and the whole is stirred in a mixing and kneading machine until completely dissolved in such a manner as to obtain a paste of suitable consistency. The quantity of sodium hydroxid employed will vary between 0.50 and 1% in accordance with the nature of the marine plants.

In order to insure the keeping of the paste, a small quantity (1/5th to 1/10th of the weight of the vegetable substances in accordance with their nature) of pitch, coal tar or other resinous products is added to the paste and also 1% of an oxidizing agent such as perchlorate of potash, peroxid of manganese, nitrate of soda, perborate of soda in order to consume the smoke coming from the resinous products or from the coal. The paste thus constituted is mixed with the coal dust in the same proportions as pitch that is to say 8 to 10% of paste and the whole is then subjected to the action of a press and dried by air or in a furnace. When dried the agglomerate is passed through a bath of varec solution obtained by dissolving the plant in hot water in which ordinary soap is dissolved in the proportion of 10 grams per liter of water. This solution forms a protecting coat which is rendered insoluble by subsequently passing the agglomerate through a bath of aluminum sulfate.

The agglomerate thus obtained does not liberate odor or smoke and resists the action of water and moisture.

The quantity of vegetable matter employed may be reduced in replacing a portion of it by cereal or gramineous flours. In this case caustic lime and silicates of alumina and lime may also be added to the product in order to render it insoluble.

The mixture of marine plants with the addition of flour, of caustic lime and of alumina and lime silicates is effected in equal proportions and this mixture is employed in the same proportions as pitch.

The ingredients can be mixed in an ordinary mixing machine, to which hot water or steam is admitted. The ingredients might also be mixed in a jacketed mixing machine through which steam circulates at the proper temperature for bringing the mixture under treatment to a temperature varying between 60 and 80°.

In order to produce efficient agglomeration, hot water is caused to drop gradually onto the kneaded mass. After mixing, this mass is molded and then dried by suitable ventilation and by heat. The product thus obtained presents all the favorable qualities of pitch agglomerates without presenting their defects, that is to say it opposes great resistance to water and moisture and liberates neither smell nor smoke.

The soap with marine plant base described above can also be utilized for forming into briquets the dust of ores intended for treatment in blast furnaces.

Claims:

1. A process of agglomerating ore, coal and the like, which comprises adding the same to a liquid containing dissolved fucine or gelose and an alkali, mixing, molding into blocks, and drying the same.

2. A process of agglomerating ore, coal and the like, which comprises adding the same to a liquid containing dissolved fucine or gelose and an alkali, mixing, molding into blocks, and drying the same, passing the blocks through a bath containing sea weeds dissolved in soap solution, and again drying.

3. A process of agglomerating ore, coal and the like, which comprises adding the same to a liquid containing dissolved fucine or gelose and an alkali, mixing, molding into blocks, and drying the same, passing the blocks through a bath containing sea weeds dissolved in soap solution, again drying, and thereafter passing the blocks through a bath of an aluminum salt, to precipitate an insoluble aluminum soap as a waterproofing agent.

4. A process of agglomerating ores, coal and the like, which comprises mixing the same with a solution containing caustic soda, a tarry material, an oxidizing agent, and dissolved sea weed.

The foregoing specification of my process for the manufacture of agglomerates signed by me this twelfth day of June, 1914.

Paris, France.

ALPHONSE EXBRAYAT.

Witnesses:
CHAS. P. PRESSLY,
RENÉ THIRIOT.

Copies of this patent may be obtained for five cents each, by addressing the "Commissioner of Patents, Washington, D. C."